United States Patent
Ito

(10) Patent No.: US 7,796,158 B2
(45) Date of Patent: Sep. 14, 2010

(54) DISK TYPE IMAGE PICKUP APPARATUS

(75) Inventor: Yoshihisa Ito, Chiba (JP)

(73) Assignee: Sony Corporation, Tokyo (JP)

( * ) Notice: Subject to any disclaimer, the term of this patent is extended or adjusted under 35 U.S.C. 154(b) by 898 days.

(21) Appl. No.: 11/699,417

(22) Filed: Jan. 30, 2007

(65) Prior Publication Data

US 2007/0177859 A1    Aug. 2, 2007

(30) Foreign Application Priority Data

Feb. 1, 2006    (JP) .......................... P2006-024931

(51) Int. Cl.
*H04N 5/228* (2006.01)
*H04N 5/00* (2006.01)

(52) U.S. Cl. .................................... 348/208.2; 386/126

(58) Field of Classification Search .............. 348/208.2, 348/208.3, 207.99, 208.5, 208.7; 386/126; 369/53.18

See application file for complete search history.

(56) References Cited

U.S. PATENT DOCUMENTS

| | | | | |
|---|---|---|---|---|
| 5,084,724 | A * | 1/1992 | Maeno | 348/E5.038 |
| 5,239,331 | A * | 8/1993 | Kobe et al. | 396/135 |
| 2003/0112728 | A1* | 6/2003 | Ono et al. | 369/53.18 |
| 2003/0133542 | A1* | 7/2003 | Takahashi et al. | 379/68 |
| 2004/0233825 | A1* | 11/2004 | Ishibashi et al. | 369/116 |
| 2005/0024504 | A1* | 2/2005 | Hoshi | 348/231.3 |
| 2007/0064555 | A1* | 3/2007 | Chu | 369/53.18 |

FOREIGN PATENT DOCUMENTS

| | | |
|---|---|---|
| JP | 63-029322 A | 2/1988 |
| JP | 07-203285 A | 8/1995 |
| JP | 08-45169 | 2/1996 |
| JP | 2001-014782 A | 1/2001 |
| JP | 2003-242652 A | 8/2003 |
| JP | 2006-107634 * | 4/2004 |

OTHER PUBLICATIONS

Japanese Office Action issued Sep. 8, 2009 for corresponding Japanese Application No. 2006-024931.

* cited by examiner

*Primary Examiner*—Nhan T Tran
(74) *Attorney, Agent, or Firm*—Rader, Fishman & Grauer PLLC

(57) ABSTRACT

A disk type image pickup apparatus wherein a disk type recording medium is used as a recording medium on which a picked up image is to be recorded, including: a gyro sensor configured to detect impact or vibration to an apparatus body of the disk type image pickup apparatus to be used for camera shake correction and detect a gyro moment arising from a movement of the apparatus body in a horizontal direction; a detection signal decision section configured to compare a level of a detection signal outputted from the gyro sensor with a threshold value and output a signal representing that the level of the detection signal is higher than the threshold value; and a recording control section configured to receive the gyro detection signal from the detection signal decision section to temporarily stop the recording of data on the disk type recording medium for a predetermined period of time.

1 Claim, 2 Drawing Sheets

DISK TYPE IMAGE PICKUP APPARATUS

CROSS REFERENCES TO RELATED APPLICATIONS

The present invention contains subject matter related to Japanese Patent Application JP 2006-024931 filed with the Japanese Patent Office on Feb. 1, 2006, the entire contents of which being incorporated herein by reference.

BACKGROUND OF THE INVENTION

1. Field of the Invention

This invention relates to a disk type image pickup apparatus, and more particularly to a disk type image pickup apparatus suitably applied to a video camera which includes a camera shake correction mechanism and uses a disk type recording medium such as an optical disk.

2. Description of the Related Art

In the related art, an optical information recording and reproduction apparatus usually employs a system for detecting impact or vibration which is applied to the optical information recording and reproduction apparatus and deteriorates the recording quality of the optical information recording and reproduction apparatus.

As an example of such an optical information recording and reproduction apparatus as described above, an optical disk apparatus has been proposed and is disclosed, for example, in Japanese Patent Laid-Open No. 2003-242707 (hereinafter referred to as Patent document 1). In the optical disk apparatus of Patent Document 1, a gyro effect of a spindle motor based on rolling (disturbance) of an optical disk body is detected, and a result of the detection of the rolling is used for servo control of the optical disk body. Further, the detection result of rolling is used as a controlling/correcting signal (for example, for camera shake correction and for screen distortion correction of an enlarged screen) to an apparatus connected to the optical disk apparatus body.

Further, video cameras and still cameras in recent years tend to include a camera shake correction function which uses a gyro sensor as a standard equipment.

SUMMARY OF THE INVENTION

Incidentally, impact or vibration detected by the optical disk apparatus disclosed in Patent Document 1 has such a level as to hinder the follow-up property of an optical pickup usually formed from a two-axis actuator or the like when it follows up an optical disk. It was confirmed by an experiment that, for example, even if an optical information recording and reproduction apparatus is turned or moved back and forth by a great amount in a horizontal direction at such a low speed that it may not be detected by a sensor for detection of impact or vibration, a gyro moment acts upon the optical disk and causes physical deformation such as warping or distortion to appear with the optical disk. Such physical deformation of the optical disk sometimes deteriorates the recording quality.

As an example of the optical information recording and reproduction apparatus, a video camera wherein an optical disk is used as a recording medium is described below. A general configuration of the video camera as viewed in an oblique direction is shown in FIG. 2. Referring to FIG. 2, the video camera 1 shown includes an optical disk accommodation section 20 configured to removably receive an optical disk. The optical disk accommodation section 20 accommodates an optical disk in a vertical direction or plane (perpendicularly to an XY plane) with respect to an apparatus body.

The case described above wherein the optical information recording and reproduction apparatus is turned or moved back and forth by a great amount at a low speed in a horizontal direction corresponds, for example, to a case wherein the video camera 1 is moved in a direction (on the XY plane) perpendicular to the plane of the optical disk or the direction of the video camera 1 is changed over. Such movement of the video camera 1 includes not only movement in the purely perpendicular direction to the plane of the optical disk but also movement which has a component in the perpendicular direction when the moving direction is decomposed in the XYZ coordinate system.

In this manner, in the system in the related art, impact or vibration when the optical information recording and reproduction apparatus is turned or moved back and forth by a great amount at a low speed in a horizontal direction may not be detected. Therefore, the system in the related art has a problem in that a recording operation may not be stopped temporarily, and as a result, upon reproduction of the optical disk, the reproduction image and sound is deteriorated.

Accordingly, it is demanded to provide a disk type image pickup apparatus which has a recording function on a disk type recording medium such as a video camera and can control a recording action making use of a sensor for camera shake detection, which is usually incorporated in a disk type image pickup apparatus, even when the apparatus is turned or moved back and forth by a great amount at a low speed in a perpendicular direction to the disk.

According to the present invention, there is provided a disk type image pickup apparatus wherein a disk type recording medium is used as a recording medium on which a picked up image is to be recorded, including: a gyro sensor configured to detect impact or vibration to an apparatus body of the disk type image pickup apparatus to be used for camera shake correction and detect a gyro moment arising from a movement of the apparatus body in a horizontal direction; a detection signal decision section configured to compare, during recording action of the disk type image pickup apparatus, a level of a detection signal outputted from the gyro sensor with a threshold value set in advance in a frequency band lower than a frequency band of the impact or vibration detected for the camera shake correction and output, when the level of the detection signal is higher than the threshold value, a signal representing that the level of the detection signal is higher than the threshold value; and a recording control section configured to receive the gyro detection signal from the detection signal decision section to temporarily stop the recording of data on the disk type recording medium.

The movement in a horizontal direction signifies a movement when the apparatus body is turned or moved back and forth by a great amount at a low speed within a plane perpendicular to the plane of the disk, and it is necessary for the movement to at least have a vertical component when it is decomposed into components of a three-dimensional coordinate system.

Further, the detection level signifies a gyro moment amount detected by the gyro sensor.

In the disk type image pickup apparatus, when the gyro moment which is generated when the disk type image pickup apparatus is swung by a great distance in a horizontal direction is higher than the predetermined level, the recording action is stopped temporarily. Consequently, otherwise possible deterioration of the information recording quality which arises from physical deformation of the disk type recording medium can be prevented. Further, since a gyro sensor for camera shake detection which is normally used in an ordinary disk type image pickup apparatus is used, it is not necessary to additionally provide a detection sensor.

In summary, the disk type image pickup apparatus can be applied to a video camera or a like apparatus having a recording function on a disk type recording medium. With the disk type image pickup apparatus, also when the apparatus is turned or moved back and forth by a great distance at a low speed in a horizontal direction, the recording action can be controlled making use of a sensor for camera shake detection, which is usually incorporated in a video camera or a like apparatus, thereby to maintain the recording quality.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

In the following, a preferred embodiment of the present invention is described.

Figure 2:
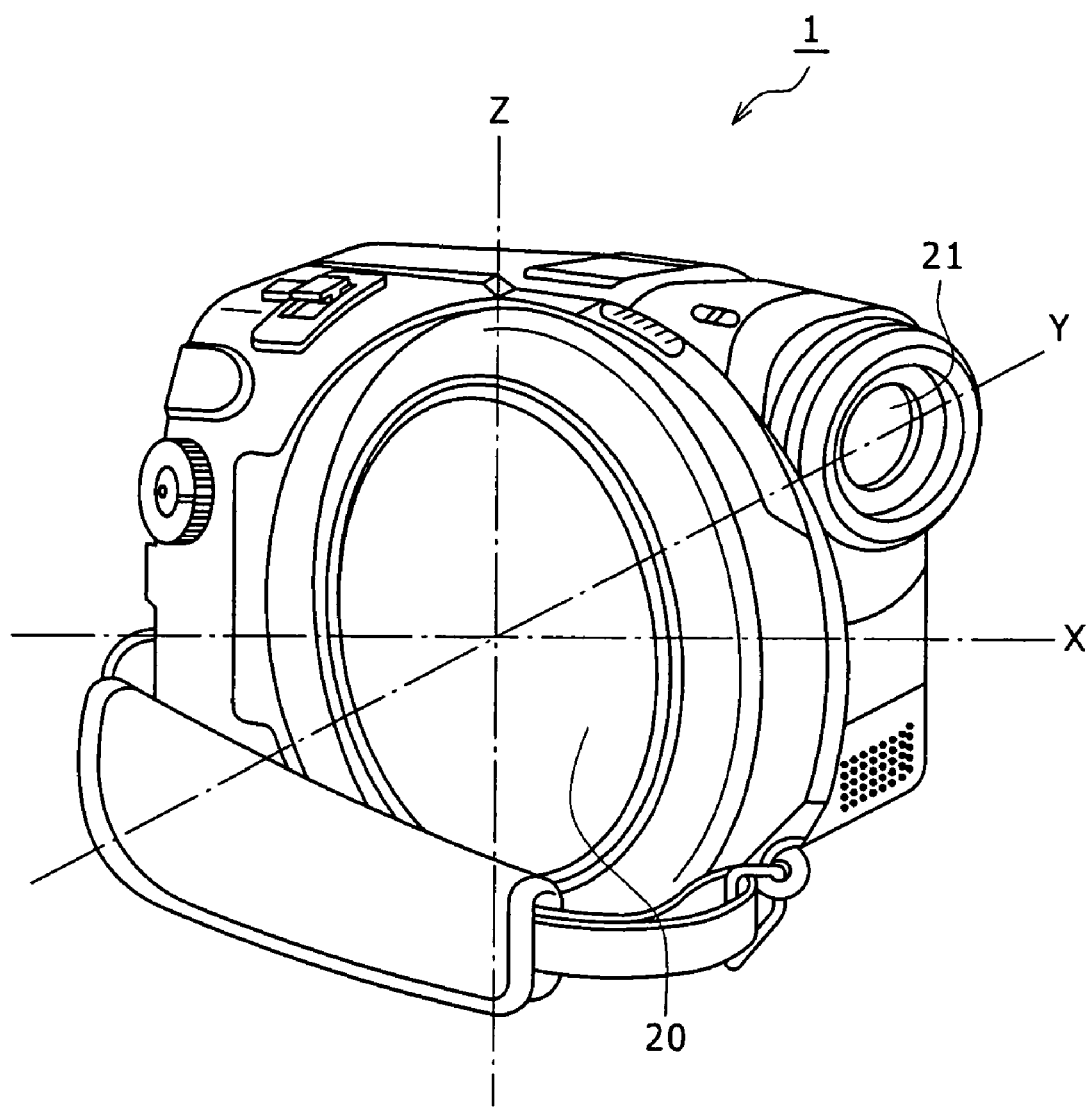
FIG. 2 is a schematic perspective view showing a video camera.

In the present embodiment, a disk type image pickup apparatus having a recording function on a disk type recording medium according to the present invention is applied to such a video camera 1 which uses an optical disk as a recording medium as shown in FIG. 2. Referring to FIG. 2, the video camera 1 shown includes an optical disk accommodation section 20 in which an optical disk is accommodated in a vertical direction or plane (perpendicularly to the XY plane in FIG. 2). The video camera 1 is configured such that, even if the video camera 1 is turned or moved back and forth by a great amount at a low speed in a horizontal (panning) direction during recording with the video camera 1, the recording quality on the optical disk can be kept good.

It is to be noted that the case wherein the video camera 1 is turned or moved back and forth by a great amount at a low speed in a horizontal direction corresponds to a case wherein the video camera 1 is moved so as to draw an ark in a direction (on the XY plane) perpendicular to the plane of the optical disk or the moving direction of the video camera 1 is changed over. Such movement of the video camera 1 is not limited to the movement in the purely perpendicular direction with respect to the plane of the optical disk but includes movement which has a component in the perpendicular direction when the moving direction is decomposed in the XYZ coordinate system.

The video camera 1 of the present embodiment has a system which performs temporary stopping of recording when disturbance such as vibration or impact exceeds a certain level set in advance and then performs re-recording. Further, for example, a gyro sensor is used as a sensor for camera shake detection. The video camera 1 has a function of optically or electrically correcting, when a gyro moment amount detected by the gyro sensor and corresponding to camera shake exceeds a level set in advance, an image to be recorded through a camera section (image pickup apparatus).

As regards the camera shake detection, occurrence of a camera shake is detected using an output from a sensor (for example, a gyro sensor) attached to the camera section for detecting panning (swinging in a horizontal direction from an ordinary image pickup posture) and tilting (swinging in a vertical direction from an ordinary image pickup posture). Then, optical or electrical correction is applied in response to the detection. For example, a shake of the optical system of the camera section is corrected or a camera shake correction process is applied to a picked up image to correct the image.

As regards detection of vibration or impact, an output of a sensor for detecting vibration or impact and an output when a tracking error signal (TE signal) or a focusing error signal (FE signal) which is a servo error signal exceeds a level set in advance are logically ANDed to detect that vibration or impact which has an influence on the recording quality is applied to an apparatus body. Then, recording is temporarily stopped and re-recording is performed in response to the detection.

According to the present invention, such a well-known configuration as described above can be utilized such that, even if the video camera 1 is turned or moved back and forth by a great amount at a low speed in a horizontal direction during recording action thereof, the recording quality on an optical disk can be kept high.

A configuration of the video camera to which the disk type image pickup apparatus of the present invention is applied is described with reference to FIG. 1.

Figure 1:
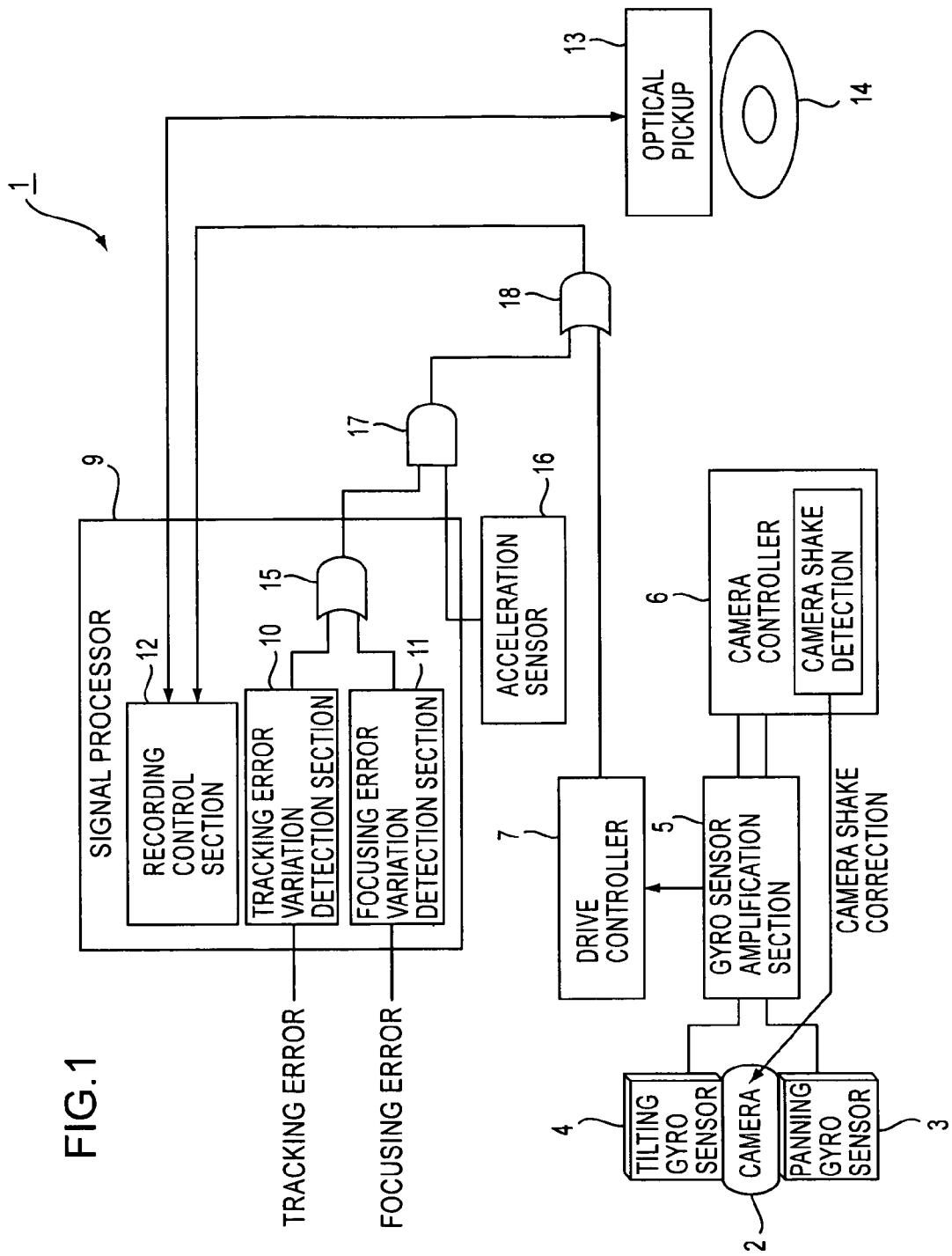
FIG. 1 is a view showing an example of a configuration of a video camera to which the present invention is applied.

The video camera 1 shown in FIG. 1 includes a camera 2, gyro sensors 3 and 4, a gyro sensor amplification section 5, a camera controller 6, a drive controller 7, a signal processor 9, an optical pickup 13, and an acceleration sensor 16.

The camera 2 is an image pickup apparatus which produces an electric signal from image information picked up by an image pickup block. To this end, the camera 2 includes an optical system including a lens and so forth, and an electric system including an image pickup element and other CMOS (Complementary Metal Oxide Semiconductor) devices. The electric signal produced by the camera 2 is converted into an image signal and recorded on an optical disk 14, for example, through a host computer not shown and the signal processor 9.

The panning gyro sensor 3 and the tilting gyro sensor 4 function as detection sections and detect the amounts of movement of the video camera 1 in the panning direction and the tilting direction, respectively, each of which represents a gyro moment amount. The detection signals of the gyro moment amounts are amplified by the gyro sensor amplification section 5 and sent to the camera controller 6.

The camera controller 6 controls the behavior of the camera 2. In particular, the camera controller 6 detects from the detection signals of the panning and tilting gyro moment amounts received through the gyro sensor amplification section 5 whether or not the video camera 1 suffers from a camera shake and issues a camera shake correction instruction to the camera 2 in response to a result of the detection. The camera controller 6 is formed, for example, from an MPU (Micro Processing Unit).

The drive controller 7 controls the optical disk drive of the video camera 1 and is formed, for example, from an MPU (Micro Processing Unit). The drive controller 7 functions as a detection signal decision section. In particular, the drive controller 7 compares the levels of the detection signals received from the panning and tilting gyro sensors 3 and 4 with predetermined levels set in advance. Then, if the drive controller 7 decides that the level of any detection signal exceeds the corresponding predetermined level, then it outputs a gyro detection signal representing such excess to the signal processor 9. It is to be noted that the drive controller 7 may include an analog/digital converter for analog/digital (A/D) converting the detection signals inputted from the gyro sensor amplification section 5.

Any of the predetermined levels set in advance indicates an allowable value (threshold value) for the gyro moment amount with which good recording quality can be kept when the video camera 1 is moved by a great amount at a low speed in a horizontal (panning) direction such as, for example, when the video camera 1 is moved more slowly than upon movement by an ordinary camera shake and particularly at such a speed that the video camera 1 is moved by more than 180 degrees in the panning angle for one second. The gyro moment to be detected is disturbance which may not be detected by vibration detection because the detection band thereof belongs to a frequency band lower than a detection band of vibration by a camera shake, and besides the level (magnitude) thereof is higher than that by vibration by an ordinary camera shake. In the present embodiment, a gyro moment amount in a band of several hertz or less which is lower than a detection band of an ordinary camera shake such as, for example, a band of several tens hertz is detected and analyzed to detect a movement of the video camera 1 in the panning direction which is not detected by ordinary camera shake detection.

The value of the frequency mentioned above is specifically indicated in order to indicate that the frequency band of a detection object in the embodiment of the present invention is lower than the frequency band of an object in ordinary camera shake detection. In other words, the frequency band of a detection object according to the present invention is not limited to the specific band given above.

The signal processor 9 is formed from, for example, a DSP (Digital Signal Processor) or the like and functions as a tracking error variation detection section 10 and a focusing error variation detection section 11 which form a servo error variation detection section, and a recording control section 12.

The tracking error variation detection section 10 receives an error signal representing that the follow-up performance of a tracking servo mechanism not shown drops lower than a preset value therefor and outputs a signal representing this to a logical OR circuit 15. Meanwhile, the focusing error variation detection section 11 receives an error signal representing that the follow-up performance of a focusing servo mechanism not shown drops lower than a preset value therefor and outputs a signal representing this to the logical OR circuit 15. It is to be noted that the preset values for the error signals relating to the servo mechanisms are retained in a storage apparatus not shown or are set suitably by a host computer or the like not shown and stored into the storage apparatus.

The logical OR circuit 15 outputs a logical OR value of the error signal from the tracking error variation detection section 10 and the error signal from the focusing error variation detection section 11. A logical AND circuit 17 logically ANDs a signal outputted from the logical OR circuit 15 and representative of an error of a servo mechanism and an acceleration detection signal representing that a detection signal of a level higher than a preset value is detected by the acceleration sensor 16, and outputs a result of the ANDing. Meanwhile, a logical OR circuit 18 logically ORs a signal from the logical AND circuit 17 and a gyro detection signal from the drive controller 7 and outputs a result of the ANDing to the recording control section 12.

The acceleration sensor 16 detects impact or vibration applied to the video camera 1 from an acceleration of the movement of the video camera 1. The reason why an error signal of a servo mechanism and a signal from the acceleration sensor 16 are logically ANDed is that it is intended to confirm from the output of the acceleration sensor 16 that an error of the servo mechanism is actually caused by impact, vibration or the like. This is because an error is likely to occur with a servo mechanism, for example, if some scar, dust or the like exists on the recording surface of an optical disk.

The recording control section 12 to which a signal is inputted from the logical OR circuit 18 analyzes the substance of the signal received from the logical OR circuit 18 and adjusts the recording power and so forth based on a result of the analysis to control the recording process for the optical pickup 13. In other words, the recording control section 12 controls such actions as starting and stopping of recording, re-recording after temporary stopping and so forth. The optical pickup 13 records an image picked up by the camera 2 on the optical disk 14 in accordance with an instruction of the recording control section 12.

The video camera 1 configured in such a manner as described above is characterized in that detection signals of gyro moment amounts outputted from the panning and tilting gyro sensors 3 and 4 are inputted to the drive controller 7 and, when any of the detection signals exceeds a predetermined level for gyro moment detection set separately from a level for camera shake detection, a gyro detection signal representing this is inputted to the recording control section 12 through the logical OR circuit 18. Since the gyro detection signals outputted from the drive controller 7 are inputted to a system for camera shake servo error detection, which is in the related art available, it is possible to temporarily stop a recording action and then perform re-recording after lapse of a predetermined period of time similarly as in a case wherein impact or vibration is detected from a servo error or the like. Although the predetermined period of time is, for example, approximately ten seconds, it may range from several to ten and several seconds.

Now, action of the video camera 1 is described.

First, detection of a camera shake by the video camera 1 is described. For the camera shake detection, the camera controller 6 receives outputs (detection signals) of the gyro moment amounts from the panning and tilting gyro sensors 3 and 4 attached to the camera 2, and compares the levels of the received detection signals with the detection levels set for camera shake correction in advance. Then, if any of the levels of the received detection levels is higher than a corresponding one of the detection levels set for camera shake correction, then the camera controller 6 decides that the camera 2 suffers from a camera shake. Then, if it is decided that the camera 2 suffers from a camera shake, then the camera controller 6 applies optical or electric correction to the camera 2. For example, the camera controller 6 corrects a shake of the optical system of the camera 2 or applies a camera shake correction process to an image picked up by the camera 2 to correct the image. Consequently, an image whose shake is corrected is obtained.

Now, normal detection of vibration or impact of the video camera 1 is described. For the detection of vibration or impact, an output of the acceleration sensor 16 for detecting vibration or impact and an output of the logical OR circuit 15 when the level of a tracking error variation signal or a focusing error variation signal which is an error signal of a corresponding servo mechanism exceeds a level set in advance are logically ANDed by the logical AND circuit 17. Then, a result of the logical ANDing is supplied to the recording control section 12 through the logical OR circuit 18. The recording control section 12 detects that vibration or impact which has an influence on the recording quality is applied to the apparatus body. Then, the recording control section 12 temporarily stops the recording for a predetermined period of time and then performs re-recording. By this, deterioration of the recording quality is prevented.

Further, an action of the video camera 1 when it is turned or moved back and forth by a great amount at a low speed in a horizontal direction is described. In particular, the panning and tilting gyro sensors 3 and 4 for camera shake detection, which are usually equipped in a video camera, are used to set levels (threshold values) for gyro detection signal detection separately from the levels for camera shake detection. The thus set levels are stored into a readable-writable storage apparatus or the like. Then, when the video camera 1 is turned or moved back and forth by a great amount at a low speed in a horizontal direction, if the drive controller 7 decides that any of the detection signals outputted from the panning and tilting gyro sensors 3 and 4 exceeds the corresponding set level (threshold value), then the drive controller 7 outputs a gyro detection signal. The gyro detection signal is inputted to the recording control section 12 of the signal processor 9 through the logical OR circuit 18. Then, when a great rocking motion in a low frequency band is detected in a panning direction, the recording control section 12 temporarily stops recording similarly as upon ordinary detection of vibration or impact and then performs re-recording after lapse of the predetermined period of time.

As a result, if the situation is such that physical deformation of the optical disk can be caused by a gyro moment, then the recording is stopped once, and consequently, deterioration of the recording quality can be prevented. For example, when the video camera 1 is rocked by 180 degrees in a horizontal direction (within the XY plane), if the speed of the rocking motion is such that the time necessary for the movement over the angle of 180 degrees is shorter than one second, then a gyro moment of a value higher than a predetermined value acts upon the optical disk 14, resulting in the possibility that the recording quality may be deteriorated. However, the present invention contributes very much to maintaining of the recording quality in a good state even in such a situation as just described.

As described above, the disk type image pickup apparatus according to the embodiment of the present invention temporarily stops recording action making use of an existing system, that is, using detection signals obtained from panning and tilting gyro sensors for camera shake detection. Therefore, the disk type image pickup apparatus can prevent otherwise possible deterioration of the information recording quality arising from physical deformation of an optical disk by a gyro moment generated when the disk type image pickup apparatus is swung in a horizontal direction by a great distance. The configuration of the disk type image pickup apparatus can be implemented using a gyro sensor for camera shake detection, which is normally used in various camera apparatus, without additionally providing a detection sensor.

Further, the disk type image pickup apparatus according to the present invention which can maintain good recording quality can achieve stabilized recording even in a use situation which involves such rocking motion which corresponds to a motion of the video camera 1 when it is swung by a great amount on an air plane, an electric car, a ship or a like vehicle.

It is to be noted that the present invention is not limited to the embodiment described hereinabove, but various medications and alterations can be made without departing from the spirit and scope of the present invention.

For example, in the embodiment described above, the disk type image pickup apparatus is a video camera of the type wherein a disk is accommodated in a vertical plane. However, the present invention can be applied, for example, also to a disk type image pickup apparatus of another type wherein an optical disk is accommodated in a horizontal plane while an optical lens 21 is directed in the same direction in FIG. 2. Also at this time, the motion of the apparatus body which is an object of measurement of the gyro moment amount is a motion by a great amount at a low speed in a direction perpendicular, that is, in a plane perpendicular, to the plane of the optical disk.

Further, in the embodiment described above, the present invention is applied to a video camera wherein an optical disk is used as a recording medium. However, the application of the present invention is not limited to this, but the present invention can be applied also to various disk type recording medium having a recording function on a disk type recording medium such as an apparatus wherein a magnet-optical disk or a next generation DVD (Digital Versatile Disk) is used as a recording medium or an apparatus which incorporates a hard disk drive (HDD).

For example, a disk type recording and reproduction apparatus wherein a recording function is incorporated in an apparatus by which image data of a movie or the like recorded on an HDD built in or a DVD loaded in a portable housing of a small size can be reproduced at any time and at any place to which the disk type recording and reproduction apparatus is carried so that the user can enjoy the movie displayed on the display screen of the apparatus is placed on the market. Thus, a broadcasting wave reception function may be provided in such a disk type recording and reproduction apparatus as described above such that data obtained by reception of a terrestrial digital broadcast (one-segment broadcast) for a portable terminal are recorded on the disk type recording medium in the disk type recording and reproduction apparatus.

What is claimed is:

1. A disk type image pickup apparatus wherein a disk type recording medium is used as a recording medium on which a picked up image is to be recorded, comprising:

a gyro sensor configured to detect impact or vibration to an apparatus body of said disk type image pickup apparatus to be used for camera shake correction and detect a gyro moment arising from a movement of said apparatus body in a horizontal direction;

a detection signal decision section configured to compare, during recording action of said disk type image pickup apparatus, a level of a detection signal outputted from said gyro sensor with a threshold value set in advance in a frequency band lower than a frequency band of the impact or vibration detected for the camera shake correction and output, when the level of the detection signal is higher than the threshold value, a signal representing that the level of the detection signal is higher than the threshold value;

a recording control section configured to receive the gyro detection signal from said detection signal decision section to temporarily stop the recording of data on the disk type recording medium for a predetermined period of time;

an acceleration sensor configured to detect impact or vibration to said apparatus body;

a logical AND circuit configured to logically AND a servo error variation signal representative of an error of a servo mechanism and an acceleration detection signal representing that the detection signal having a level higher than a preset value is detected by said acceleration sensor and output a result of the logical ANDing; and a logical OR circuit configured to logically OR an output signal from said logical AND circuit and the gyro detection signal outputted from said detection signal decision section and output a result of the logical ORing to said recording control section, said recording control section causing the recording of data on the disk type recording medium to be temporarily stopped for a predetermined period of time based on an output of said logical OR circuit.

* * * * *